Aug. 31, 1937.  S. K. HOFFMAN ET AL  2,091,637
DRIVING MECHANISM FOR PROPELLERS
Original Filed Oct. 29, 1934
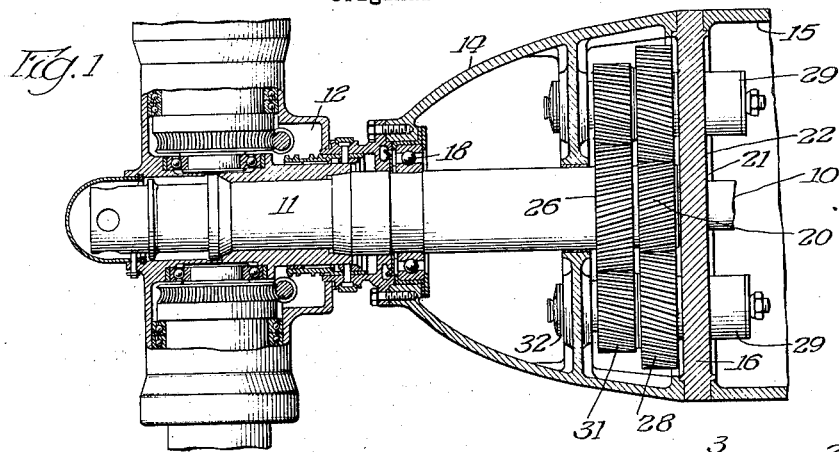
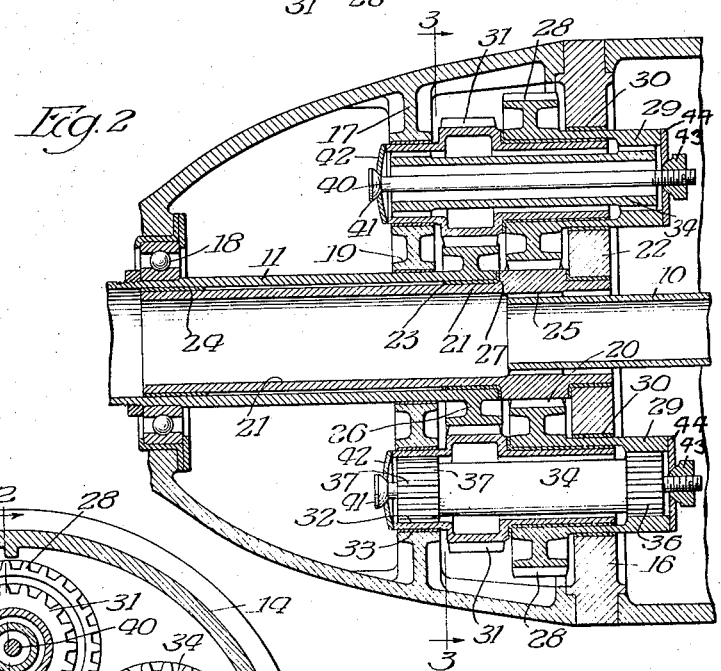
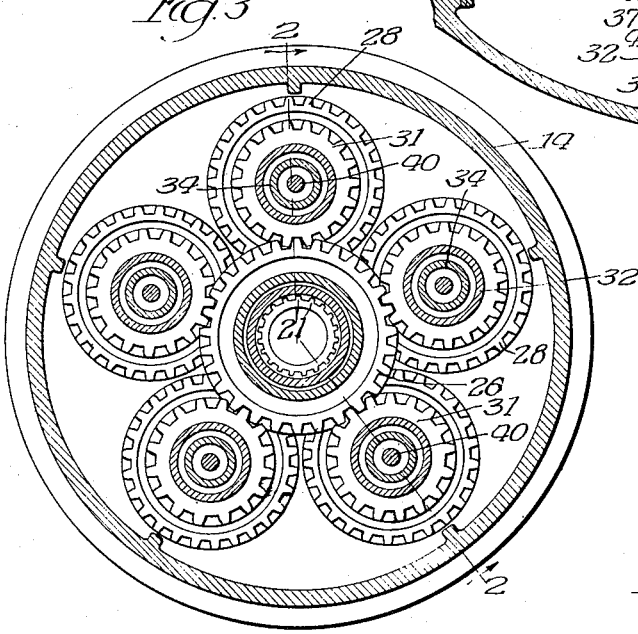
Inventors.
Samuel K. Hoffman &
Clarence H. Wiegman
By Fred Gerlach Atty.

Patented Aug. 31, 1937

2,091,637

UNITED STATES PATENT OFFICE 2,091,637

DRIVING MECHANISM FOR PROPELLERS

Samuel K. Hoffman and Clarence H. Wiegman, Williamsport, Pa., assignors, by mesne assignments, to Aviation Manufacturing Corporation, Chicago, Ill., a corporation of Delaware Application October 29, 1934, Serial No. 750,501
Renewed January 2, 1937

9 Claims. (Cl. 74—410)

The invention relates to transmission gearing and more particularly to the type adapted for use in driving aircraft propellers from the engine.

In driving aircraft propellers by means of an internal combustion engine, it has been found desirable to use reduction gearing between the engine and the propeller. The necessity in aircraft for light power plant weight requires that the reduction gearing shall be light and compact and normally operable at high values of working stresses. Since the loads imposed upon the teeth of the reduction gearing are vibratory in character, which results from variation in the torque impulses caused by the explosions in the individual engine cylinders and torsional vibrations in the crank-shaft, it is very desirable to protect the gearing from additional loads due to mechanical imperfections which cause failure in operation. In transmission of this type compactness can be achieved by employing a plurality or series of intermediate gears which engage the driving and driven gears.

One object of the invention is to provide improved speed reducing transmission adapted for use on aircraft in which spirally or oblique toothed gears are used, and in which the loads upon the intermediate gears will be substantially equalized or equally distributed to prevent an excessive individual loading of any of the intermediate gears.

Another object of the invention is to provide simple and efficient transmission gearing which is adapted for driving aircraft propellers and which includes oblique or helically toothed gears.

Other objects of the invention will appear from the detailed description.

The invention consists in the several novel features which are hereinafter set forth and are more particularly defined by claims at the conclusion hereof.

In the drawing:

Fig. 1 is a longitudinal section of a transmission gearing embodying the invention and applied to an aircraft propeller, parts being shown in elevation.

Fig. 2 is a longitudinal section on line 2—2 of Fig. 3.

Fig. 3 is a transverse section on line 3—3 of Fig. 2.

The invention is exemplified in mechanism comprising a shaft 10, which may be the crank-shaft of the engine or an extension thereof, and constitutes the drive shaft for the transmission; a propeller shaft 11 co-axial with the shaft 10 and to which is secured the hub 12 in which the propeller blades 13 are mounted, in any suitable manner well understood in the art; and a housing or gear-case 14, which is fixedly secured to an extension 15 of the engine casing. The shaft 11 constitutes the shaft which is driven at a reduced speed from the shaft 10. A supporting head or plate 16 is secured between the rear end of case 14 and the engine casing 15 and forms a back-wall for said case. An integral wall 17 is provided in the case 14. Propeller shaft 11 is hollow and is journaled in a ball-bearing 18 and at 19 in the wall 17. A driving gear or pinion 20 is integral with a hollow shaft 21 which is extended rearwardly and journaled at 22 in the head 16 and forwardly into the hollow shaft 11, wherein it is also journaled, as at 23 and 24. The drive-shaft 10 extends into the shaft 21 and is splined thereto, as at 25, to drive the pinion 20. The outer periphery of gear 20 is provided with oblique or helical teeth. A gear 26 integral with shaft 11, is also provided with oblique or helical teeth. The rear end of shaft 11 abuts against a bearing shoulder 27 on gear 20 to position gears 26 and 25 for axial forces which are applied to gears 20, 26.

The mechanism for driving the gear 26 from power derived from the gear 20 comprises a series of intermediate gear units in any desired number. Each of these intermediate units comprises a gear 28 and a co-axial gear 31 rotatable therewith. Each gear 28 has a rearwardly extending hollow hub 29 which is journaled at 30 in the head 16 and is provided on its outer periphery with helical or oblique teeth which mesh with the teeth on the drive pinion 20. Each gear 31 has its hollow hub 32 extended forwardly and journaled at 33 in the wall 17 and its rear end extended into and journaled into the hub 29 of gear 28 and is provided on its outer periphery with helical or oblique teeth meshing with the oblique teeth on driven gear 26. The gears 28, 31 of each unit are connected for conjoint rotation by a hollow shaft 34 which extends axially through the hubs of said gear and is splined at one of its ends, as at 36, to the hub 29 of gear 28, and at its other end, as at 37, to the hub of gear 31. These splines permit relative axial movement between the gears 28, 31 and transmit the torque from gear 28 to gear 31. The axial movement of gears 28, 31 toward each other is limited by shoulders 38 between the hubs of said gears. A tension rod or bolt 40 extends through the hollow shaft 34 and is provided with a head 41 at one end, which engages the outer side of a cupped head or washer 42, the margin of which bears against the front end of the hub 32 of gear 31. At its rear end, shaft 40 is provided with a threaded nut 43 which engages a washer or head 44, the margin of which engages the rear end of hub 29 of gear 28. This rod 40 serves as a tension member for resiliently holding the gears 28, 31 together, axially, and independently of the hollow shaft 34.

The helical teeth on gears 20, 26 are cut in the same direction or trend and the mating gears 28, 31 are cut in the opposite direction or trend. As a result, when the engine shaft is driven in the direction for which it is designed, the axial thrust produced between gears 20 and 28 will be in opposite directions, so that there will be a forward thrust on the pinion or gear 26 and a rearward or opposite thrust on gears 28. Similarly, the thrust produced by engagement of gears 26 and gears 31 will be in opposite directions so that the thrust on gears 26 will be rearward and the thrust on gears 31 will be forward. As a result axial thrust stresses in opposite directions will be developed on the gears 28, 31. These stresses will be resiliently resisted by the resilient tension bolts 40 which will permit the gears 28, 31 to be spread apart and move axially relatively to gears 20, 26 under any increment of the load imposed on the gearing.

In operation, power transmitted to shaft 10 will drive pinion 20 which will drive the entire set of intermediate gears 28. The torque from gears 28 will be transmitted through the splines 36, shafts 34, and splines 37 to the gears 31, and thence to the gears 26 on the propeller shaft which will be driven at a reduced speed relatively to the drive shaft. The helix angle of the teeth on gears 28, 31 is preferably proportioned so that the thrusts are equal and opposite. The angle of the helical gear teeth on gear 31 is such that it develops an axial component of the tooth load in the direction opposite to that developed by the helical teeth on gear 28 and, in consequence, the bolt 40 of each intermediate unit is placed in tension. The head 41 of bolt 40 bears against a head or disk 42, the margin of which bears against the outer end of the hub 32 of gear 31. A nut 43 is threaded to the other end of bolt 40 and engages a disk 44, the margin of which engages the outer end of the hub 29 of gear 28. Forces tending to separate the gears 28, 31 will be transmitted through disks 42, 44 to the bolt and subject the bolt to tensile stresses. In the event of an imperfect tooth profile or the introduction of foreign matter, or for any other reason, the driving tooth load of gear 20 is momentarily increased, the reaction of the driven tooth on gear 26 will suffer a corresponding increase and the corresponding increment in axial thrust will operate to separate gears 28, 31, as permitted by the resilient tension of bolt 40. Bolt 40 will be preferably so proportioned that it will yield an appreciable amount under the added tension and thereby permit the gears 28, 31 of any unit to be relieved of the increment of load by the resilient separation permitted by the bolt 40 so that the increment will be absorbed by, or distributed to, the gears of all of the intermediate units. The amount of force applied to the rod is controlled by the helix angle of the gears and may be of any value which may be desired. If the disks 42, 44 are rigid, the controlling factor in the amount of elasticity obtained is the length of the bolt or rod 40. When the gearing is subjected to heavy bolts, the rod or bolt is stressed and the area of the rod is such that the total force of the rod is sufficient to take care of the separating force of the gears.

Equality of gear loading can be obtained in initial assembly by impressing torsion between driving shaft 10 and the driven shaft 11, which will tend to separate the gears of each intermediate unit. Equality of loading may then be determined by means of equality of opposed thrust as measured by the elongation in tension rods 40 and adjustment of the nuts 43 until the units are equally loaded.

The invention exemplifies a transmission gear comprising helical gearing with intermediate helical toothed gears which are resiliently positioned to permit them to yield axially to equalize the tooth load among the gears of the several units under abnormal conditions, such as an imperfect tooth profile, the introduction of foreign matter, or other causes.

The invention is not to be understood as restricted to the details set forth since these may be modified within the scope of the appended claims without departing from the spirit and scope of the invention.

What we regard as new and desire to secure by Letters Patent is:

1. In transmission gearing, the combination of drive and driven gears, a plurality of pairs of coaxial helical gears between the drive and driven gears, each pair of gears being connected to rotate together and mounted for relative axial movement, and means for resiliently resisting axial separation of the gears of each pair to equalize the tooth load thereon.

2. In transmission gearing, the combination of drive and driven gears, a plurality of pairs of coaxial helical gears between the drive and driven gears, each pair of gears being connected to rotate together and mounted for relative axial movement, and means for resiliently resisting relative axial movement of the gears of each pair to equalize the tooth load thereon, comprising means whereby such resistance may be varied for equality of loading between the pairs of gears.

3. In transmission gearing, the combination of drive and driven gears, a plurality of pairs of coaxial helical gears between the drive and driven gears, each pair of gears being connected to rotate together and mounted for relative axial movement and means for resiliently resisting axial separation of the gears of each pair to equalize the tooth load thereon, said means comprising an element extending through the pair of gears.

4. In transmission gearing, the combination of drive and driven gears, a plurality of pairs of coaxial helical gears between the drive and driven gears, each pair of gears being connected to rotate together and mounted for relative axial movement and means for resiliently resisting relative axial movement of the gears of each pair to equalize the tooth load thereon, comprising elements applied to the outer ends of the gears, and a rod between said elements.

5. In transmission gearing, the combination of a housing, drive and driven gears mounted in the housing, a plurality of pairs of coaxial helical gears between the drive and driven gears, the gears of each pair being connected to rotate together, and having interfitting hub portions and hub portions separately journaled in and axially movable in the housing, and means between the outer ends of the hubs for resiliently resisting relative axial movement of each pair of gears to equalize the tooth load thereon.

6. In transmission gearing, the combination of a housing, drive and driven gears mounted in the housing, a plurality of pairs of coaxial helical gears between the drive and driven gears, the gears of each pair being connected to rotate together and having interfitting hub portions and hub portions at their opposite ends separately journaled in and axially movable in the housing, and means between the outer ends of the hubs for resiliently resisting relative axial movement of each pair of gears to equalize the tooth load thereon, comprising an element extending through the hubs.

7. In transmission gearing, the combination of a housing, drive and driven gears mounted in the housing, a plurality of pairs of coaxial helical gears between the drive and driven gears, the gears of each pair having interfitting hub portions and hub portions at their opposite ends separately journaled in and axially movable in the housing, a sleeve splined to and supported by the hub portions at the outer ends of each pair of gears, and means between the outer ends of the hubs for resiliently resisting relative axial movement of each pair of gears to equalize the tooth load thereon.

8. In transmission gearing, the combination of a housing, drive and driven gears coaxially mounted in the housing, a plurality of pairs of coaxial helical gears between the drive and driven gears, journaled in and axially movable in the housing, a sleeve within and splined to the hub of each pair of gears and means between the outer ends of the hubs for resiliently resisting relative axial movement of each pair of gears to equalize the tooth load thereon, comprising an element extending through the sleeve.

9. In transmission gearing, the combination of a housing, drive and driven gears coaxially mounted in the housing, a plurality of pairs of coaxial helical gears between the drive and driven gears, journaled in and axially movable in the housing, a sleeve within and splined to the hub of each pair of gears and adjustable means between the outer ends of the hubs for resiliently resisting relative axial movement of each pair of gears to equalize the tooth load thereon, comprising an element extending through the sleeve.

SAMUEL K. HOFFMAN.
CLARENCE H. WIEGMAN.